US009292296B2

(12) United States Patent
Chen et al.

(10) Patent No.: US 9,292,296 B2
(45) Date of Patent: Mar. 22, 2016

(54) CODE OPTIMIZATION BASED ON INFORMATION OF READABLY CONVERTED EXECUTED INSTRUCTION GROUPS REPRESENTED IN ADDRESS FILE

(75) Inventors: Qin Yue Chen, Shanghai (CN); Qi Liang, Shanghai (CN); Hong Chang Lin, Shanghai (CN); Feng Liu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1001 days.

(21) Appl. No.: 13/456,335

(22) Filed: Apr. 26, 2012

(65) Prior Publication Data

US 2012/0297168 A1 Nov. 22, 2012

(30) Foreign Application Priority Data

May 18, 2011 (CN) .......................... 2011 1 0129608

(51) Int. Cl.
*G06F 9/38* (2006.01)
*G06F 9/45* (2006.01)
*G06F 11/36* (2006.01)
*G06F 11/34* (2006.01)

(52) U.S. Cl.
CPC .............. *G06F 9/3885* (2013.01); *G06F 8/443* (2013.01); *G06F 8/45* (2013.01); *G06F 9/3838* (2013.01); *G06F 9/3857* (2013.01); *G06F 11/348* (2013.01); *G06F 11/3628* (2013.01); *G06F 11/3636* (2013.01); *G06F 2201/88* (2013.01)

(58) Field of Classification Search
CPC ........ G06F 9/38; G06F 9/3836; G06F 9/3842
See application file for complete search history.

(56) References Cited

U.S. PATENT DOCUMENTS

| 6,324,640 | B1 | 11/2001 | Le et al. |
| 6,553,480 | B1 | 4/2003 | Cheong et al. |
| 6,654,869 | B1 | 11/2003 | Kahle et al. |
| 7,020,765 | B2 * | 3/2006 | Nguyen et al. ................. 712/200 |
| 7,739,482 | B2 | 6/2010 | Nguyen et al. |

(Continued)

FOREIGN PATENT DOCUMENTS

CN 101329638 A 12/2008

OTHER PUBLICATIONS

ProfileMe: Hardware Support for Instruction-Level Profiling on Out-of-Order Processors, Mar. 2012, Jeffrey Dean, James Hicks, Carl A. Waldspurger, William E. Weihl, George Chrysos, 12 pgs.

*Primary Examiner* — Kenneth Kim
(74) *Attorney, Agent, or Firm* — Steven Chiu, Esq.; Blanche E. Schiller, Esq.; Heslin Rothenberg Farley & Mesiti P.C.

(57) ABSTRACT

Processing instruction grouping information is provided that includes: reading addresses of machine instructions grouped by a processor at runtime from a buffer to form an address file; analyzing the address file to obtain grouping information of the machine instructions; converting the machine instructions in the address file into readable instructions; and obtaining grouping information of the readable instructions based on the grouping information of the machine instructions and the readable instructions resulted from conversion. Status of grouping and processing performed on instructions by a processor at runtime can be acquired dynamically, such that processing capability of the processor can be better utilized.

20 Claims, 7 Drawing Sheets

(56) References Cited

U.S. PATENT DOCUMENTS

| | | |
|---|---|---|
| 2006/0174091 A1 | 8/2006 | Le et al. |
| 2006/0212761 A1 | 9/2006 | Levine et al. |
| 2009/0077354 A1 | 3/2009 | Rangan et al. |
| 2009/0288063 A1 | 11/2009 | Rangan et al. |
| 2010/0333098 A1 | 12/2010 | Jordan et al. |
| 2011/0302392 A1* | 12/2011 | Abernathy et al. ........... 712/215 |

* cited by examiner

| IA | offset | count |
|---|---|---|
| 0x00000164 | 0000 1111 1111 | 2 |
| 0x00000164 | 0000 0001 1111 | 10 |
| 0x00000168 | 0000 1111 1111 | 100 |
| 0x00000168 | 0000 0001 1111 | 300 |
| 0x00000168 | 0000 0001 0010 | 600 |
| 0x0000016c | 0000 0001 1111 | 5 |
| 0x00000170 | 0000 1111 1111 | 20 |
| 0x00000164 | 0000 0010 1111 | 5 |

| address | readable instruction |
|---|---|
| 0x00000164 | a |
| 0x00000168 | b |
| 0x0000016c | c |
| 0x00000170 | d |

| group | count |
|---|---|
| a | 2 |
| a, b | 10 |
| b | 100 |
| b, c | 300 |
| b, c, d | 600 |
| c, d | 5 |
| d | 20 |
| a, c | 5 |

| IS | group count | total count | first IS count |
|---|---|---|---|
| a | 15 | 17 | 15 |
| b | 910 | 1010 | 900 |
| c | 910 | 910 | 5 |
| d | 605 | 625 | 0 |

CODE OPTIMIZATION BASED ON INFORMATION OF READABLY CONVERTED EXECUTED INSTRUCTION GROUPS REPRESENTED IN ADDRESS FILE

PRIOR FOREIGN APPLICATION

This application claims priority from Chinese patent application number 201110129608.0, filed May 18, 2011, which is hereby incorporated herein by reference in its entirety.

BACKGROUND

One or more aspects of the invention relate to instruction grouping in a processor, and more particularly, to a method and apparatus for tracing instruction grouping.

Development in information technology has put higher and higher requirements on a processor's execution capability. To get higher processing capability, the processor has gradually developed from early in-order execution into out-of-order execution (or referred to as OoOE) that is often adopted today.

In the in-order execution scheme, a processor firstly prefetches and decodes an instruction, then reads operand(s) from memory according to the decoded instruction. If the operand(s) is/are currently available, the instruction is dispatched to an appropriate functional unit for execution. After the execution is completed, the functional unit writes execution results back into a register file. However, if one or more operands are unavailable (generally because the processor is prefetching these operands from memory) at current clock cycle, then the processor will stall until these operands are available.

Since the in-order execution scheme makes a processor waste some instruction clock cycles in waiting, many high performance processors adopt an out-of-order execution scheme to fully take advantage of these wasted clock cycles.

In particular, in the out-of-order execution scheme, instructions are firstly prefetched and arranged in an instruction sequence. When an instruction A in the sequence is temporarily unable to be executed due to its unavailable operand(s), the processor analyzes a subsequent instruction B. If the execution of instruction B is not dependent on the execution result of the previous instruction A, then the processor will send instruction B to an appropriate functional unit for execution. Results of execution are also written into a queue for restoring original instruction order.

BRIEF SUMMARY

Aspects of the present invention are proposed in view of problems with prior schemes, the purpose of which is for processing instruction grouping information of a processor at runtime.

According to a first aspect of the invention, there is provided a method for processing instruction grouping information, comprising: reading addresses of machine instructions grouped by a processor at runtime from a buffer to form an address file; analyzing the address file to obtain grouping information of the machine instructions; converting the machine instructions in the address file into readable instructions; and obtaining grouping information of the readable instructions based on the grouping information of the machine instructions and the readable instructions resulted from the conversion.

According to a second aspect of the invention, there is provided an apparatus for processing instruction grouping information, comprising: an address reading unit configured to read addresses of machine instructions grouped by a processor at runtime from a buffer to form an address file; an analysis unit configured to analyze the address file to obtain grouping information of the machine instructions; an instruction conversion unit configured to convert the machine instructions in the address file into readable instructions; and an information obtaining unit configured to obtain grouping information of the readable instructions based on the grouping information of the machine instructions and the readable instructions resulted from the conversion.

With the above, status of grouping and processing performed on instructions by a processor at runtime can be acquired dynamically and represented as user readable form, so that a user can learn instructions' grouping information to better utilize the processing capability of the processor.

DETAILED DESCRIPTION

Figures 1, 2:
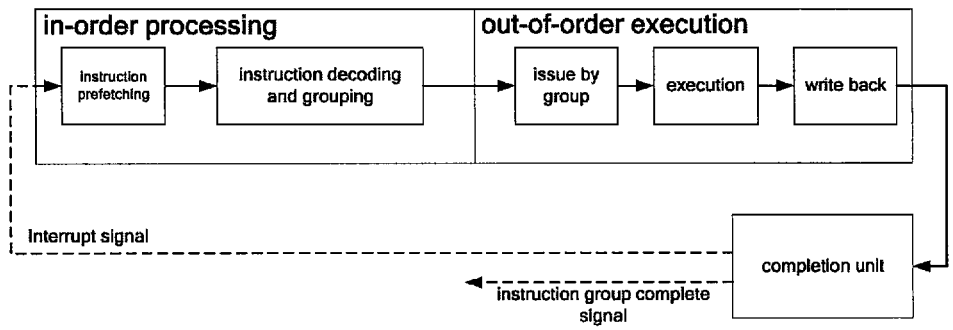
FIG. 1 shows a diagram of a processor performing instruction grouping and out-of-order execution.
FIG. 2 shows an example of a view of pipeline information captured by prior art.

As will be appreciated by one skilled in the art, aspects of the present invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium having computer usable program code embodied in the medium.

Any combination of one or more computer readable medium may be utilized. The computer readable medium may be computer-readable signal medium or computer-readable storage medium. The computer-readable storage medium may be, for example but not limited to, an electronic, magnetic, optical, electromagnetic, infrared, or semiconductor system, apparatus, device or any combinations thereof. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device or any proper combinations thereof. In the context of this document, a computer-readable storage medium may be any tangible medium that can contain, or store the program for use by or in connection with the instruction execution system, apparatus, or device.

Computer readable signal medium may include a propagated data signal with the computer-readable program code embodied therewith, either in baseband or as part of a carrier wave. Such propagated signal may use any proper form, including but not limited to, electromagnetic signal, optical signal, or any proper combination thereof. Computer readable signal medium may be any computer readable medium that is different from computer-readable storage medium and can communicate, propagate, or transport the program for use by or in connection with the instruction execution system, apparatus, or device.

Program code included in the computer readable medium may be transmitted using any appropriate medium, including but not limited to wireless, wireline, optical fiber cable, RF, etc. or any proper combination thereof.

Computer program code for carrying out operations of the present invention may be written in any combination of one or more programming languages, including an object oriented programming language such as Java, Smalltalk, C++ or the like and conventional procedural programming languages, such as "C" programming language or similar programming languages. The program code may execute entirely on a user computer, partly on a user computer, as a stand-alone software package, partly on user computer and partly on a remote computer or entirely on a remote computer or server. In the latter scheme, the remote computer may be connected to the user computer through any type of network, including a local area network (LAN) or a wide area network (WAN), or the connection may be made to an external computer (for example, through the Internet using an Internet Service Provider).

Below, aspects of the invention will be described with reference to flowchart and/or block diagram of methods, apparatuses (systems) and computer program products of the embodiment of the invention. Note that, each block of the flowchart and/or block diagram, and combinations of blocks in the flowchart and/or block diagram, can be implemented by computer program instructions. These computer program instructions may be provided to a processor of a general-purpose computer, a special-purpose computer or other programmable data processing apparatus to produce a machine, such that the instructions which execute on the computer or other programmable data processing apparatus create means for implementing the functions/actions specified in the block(s) of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the functions/actions specified in the block(s) of the flowchart and/or block diagram.

The computer program instructions may also be loaded into a computer or other programmable data processing apparatus to perform a series of operational steps on the computer or other programmable data processing apparatus so as to produce a computer implemented process, such that the instructions which execute on the computer or other programmable data processing apparatus will provide a process for implementing the functions/actions specified in the block(s) of the flowchart and/or block diagram.

Next, aspects of the invention will be described in conjunction with detailed embodiments with reference to drawings. Such description is merely for illustrative purpose and is not meant to limit the scope of the invention.

In case that a processor, particularly a multi-core processor, adopts an out-of-order execution scheme, multiple pieces of instructions are often executed in parallel in conjunction with a grouping of instructions so as to further improve the processor's execution performance. FIG. 1 shows a diagram that a processor performs instruction grouping and out-of-order execution. As shown, a processor's processing on instructions may be divided into an in-order processing part and an out-of-order processing part. In the in-order processing part, an instruction prefetching unit prefetches multiple pieces of instructions and arranges them into a queue. Next, an instruction decoding and grouping unit decodes the prefetched instructions and groups the instructions. Generally, the grouping of instructions depends on many factors such as structure of the processor, feature of an instruction etc. Normally, if multiple successive instructions in an instruction queue can be executed in parallel independently, then it is possible to arrange these instructions into one group for subsequent parallel execution. After the instructions are grouped, the processing enters into an out-of-order processing phase. In this phase, first, a group issuing unit issues multiple pieces of instructions in an instruction group to appropriate functional units respectively. Next, these functional units respectively execute the received instructions independently, and then write the execution result back to a register file. Once execution of an instruction group is completed, a completion unit will issue an "instruction group complete" signal and return an interrupt to the instruction prefetching unit, notifying it to keep on with the prefetching of instructions.

In a specific example, assume that the instruction prefetching unit can maintain up to eight instructions and arrange them into a queue. Through the analysis by the instruction decoding and grouping unit, it is found that the first three instructions in the instruction queue all perform add operations on operands and execution results thereof are independent to each other, then the instruction decoding and grouping unit groups these three instructions together and sends them to the group issuing unit. The group issuing unit sends these three instructions to three functional units (e.g. adders) respectively to perform operations simultaneously. After execution of this group of instructions has all been completed, the completion unit issues an "instruction group complete" signal and returns an interrupt to the instruction prefetching unit. Upon receiving such interrupt signal, the instruction prefetching unit further prefetches three pieces of instructions to keep the length of the queue. The instruction decoding and grouping unit accordingly analyzes, decodes and groups instructions in the new queue, such that instructions can be executed in parallel.

It can be seen that, in the scheme of OoOE execution of grouped instructions, an instruction's grouping is closely related to a processor's computation efficiency. If a relatively larger number of successive instructions can be grouped into one group and executed in parallel, then execution efficiency will be significantly improved. Therefore, it is meaningful to analyze and study instruction grouping in a processor in order to improve processor performance. For example, when writing a program and generating codes in a compiler back-end, if an engineer can learn how a processor groups instructions at runtime and how the OoOE scheme acts upon a particular instruction stream during execution, then it is possible for the engineer to optimize the instructions, for instance, to perform certain rearrangement, such that the rearranged instructions can more efficiently take advantage of an instruction grouping scheme and an OoOE scheme, thereby better utilizing a processor's computation resource.

However, in prior art, given a certain type of processor and a particular instruction sequence, it is difficult for existing methods to obtain the grouping and execution status performed on instructions by the processor at runtime, nor can it analyze and learn how to make the instruction stream better utilize an OoOE scheme to acquire high execution efficiency.

In one scheme of the prior art, there is provided a code analyzer that performs static analysis on instructions based on structure of the processor and gives some static information about instruction grouping, such as marking different instruction groups with different colors. However, those skilled in the art can appreciate that grouping of instructions varies over time. Although such code analyzer can give some static analysis about instruction grouping, it can not learn dynamic behavior of the processor at runtime. In another scheme, there is provided a processor pipeline analyzer. When instructions are executed on a processor simulator or on a real processor, the analyzer captures an instructions' pipeline information and illustrates such pipeline information with a pipeline flat visualization. FIG. 2 shows an example of a view of pipeline information captured by prior art. Since such pipeline analyzer is not tailored to perform instruction grouping analysis, as shown, the resulting flat visualization can not show instruction grouping' variation over time at different pipeline stages, nor can it show which instruction groups are more popular during execution.

Therefore, it is desired to provide a scheme capable of learning dynamic information about grouping of instructions performed by a processor at runtime, so as to take better advantage of processor's OoOE to improve execution performance.

Figure 3:
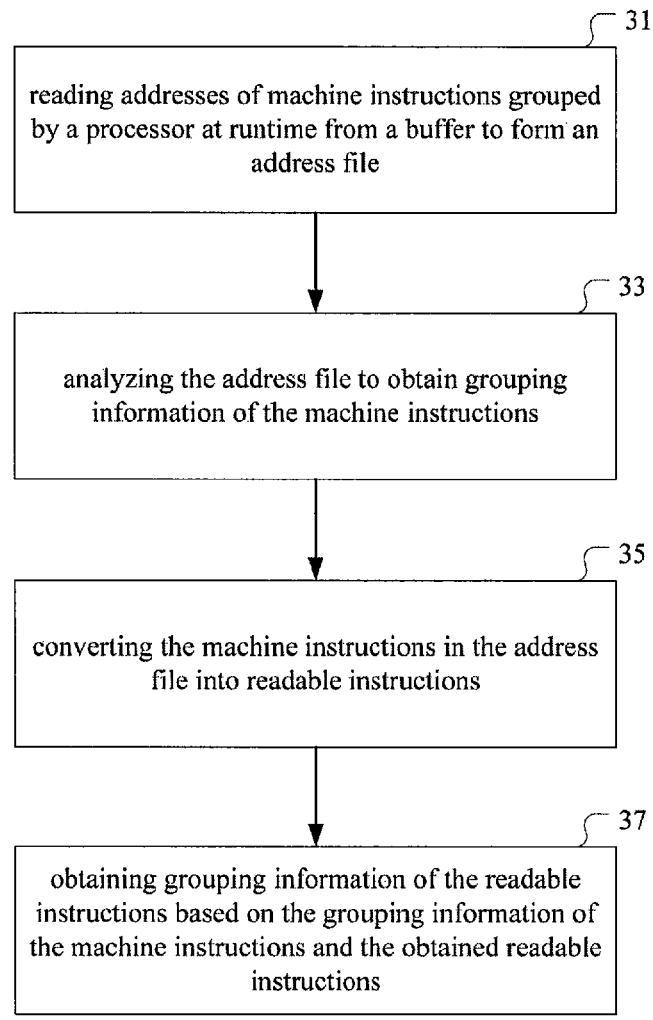
FIG. 3 shows a flowchart of a method for obtaining instruction grouping information according to an embodiment of the invention.

FIG. 3 shows a flowchart of a method for obtaining instruction grouping information according to an embodiment of the invention. As shown in FIG. 3, the method of one embodiment comprises the following steps: step 31 of reading addresses of machine instructions grouped by a processor at runtime from a buffer to form an address file, step 33 of analyzing the address file to obtain grouping information of the machine instructions, step 35 of converting the machine instructions in the address file into readable instructions, and step 37 of obtaining grouping information of the readable instructions based on the grouping information of the machine instructions and the converted readable instructions.

In particular, at step 31, addresses of the grouped instructions are read from a buffer. The buffer is to be able to record and store status of grouping performed on instructions by a processor at runtime. To this end, improvements may be made to a prior art processing system to add a buffer with the above functions.

Figure 4:
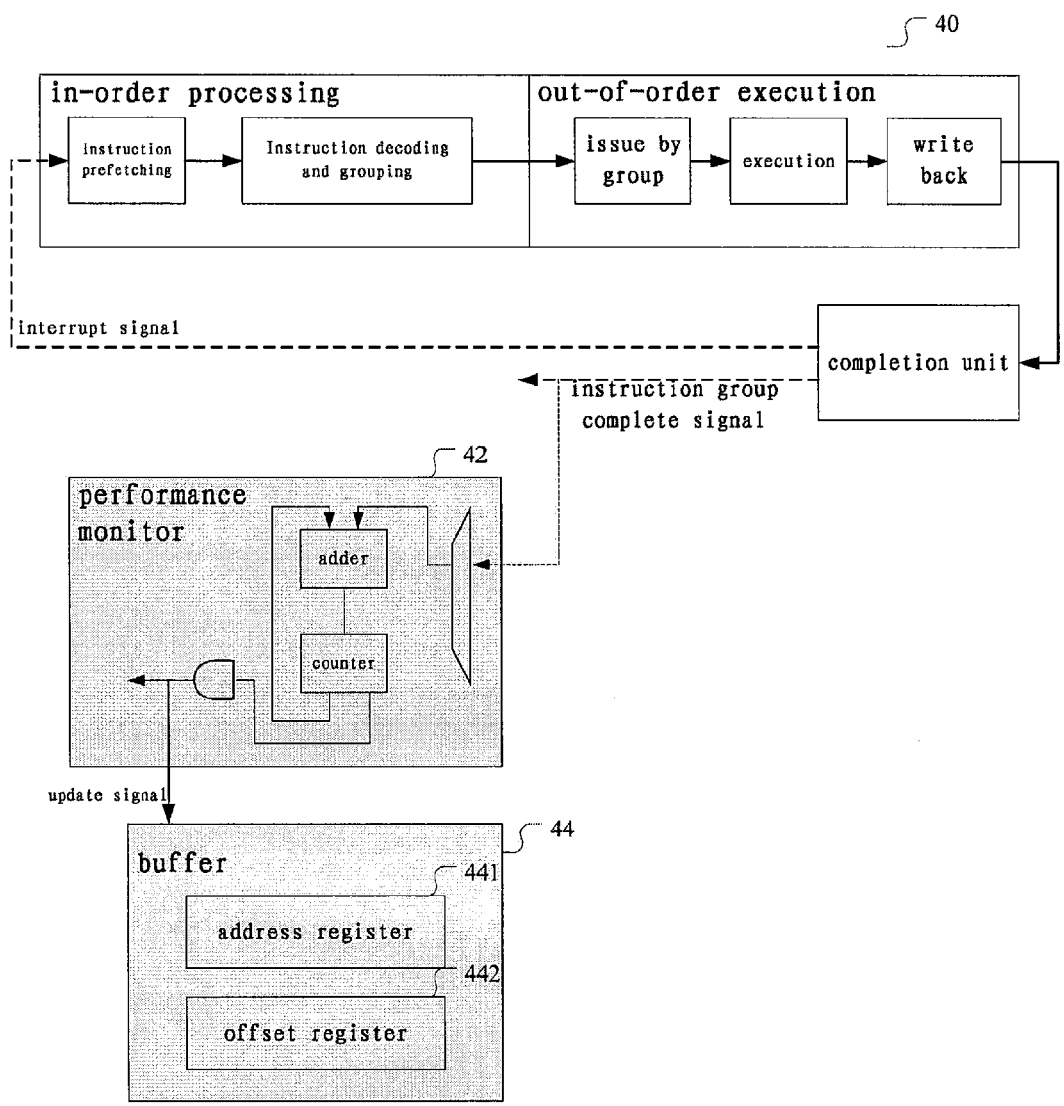
FIG. 4 shows a diagram of a processing system according to an embodiment of the invention.

FIG. 4 shows a diagram of a processing system according to an embodiment of the invention. As shown, the processing system in this embodiment comprises a processor 40, a performance monitor 42 and a buffer 44. The processor 40 is the same as the existing processor shown in FIG. 1, and includes an in-order processing part and an out-of-order processing part for performing grouped execution of instructions. Furthermore, as mentioned above, the processor 40 includes a completion unit. Whenever the processor completes the execution of a group of instructions, the completion unit will issue an "instruction group complete" signal and return an interrupt to the instruction prefetching unit, notifying it to keep on the prefetching of instructions. Accordingly, the completion unit temporarily stores therein the information of instruction group that has just been executed, for example, number of instructions in the instruction group, addresses of the instructions, etc. Moreover, the completion unit will include information about number of instructions contained in the instruction group into the above interrupt signal, so that the prefetching unit will know how many instructions are to be supplemented into the instruction queue next. To acquire information of instruction group executed by the processor, in one embodiment, the performance monitor 42 is constructed to capture the instruction group complete signal issued by the completion unit and thereby issue an update signal to the buffer 44. Upon triggered by the update signal, the buffer 44 reads information of the executed instruction group from the completion unit, thereby recording addresses of the grouped instructions.

In particular, in an example, the performance monitor 42 is constructed to further include a counter on the basis of an existing performance monitor. The counter is set to count the number of times the captured instruction group complete signal occurs. Whenever the counter increases by 1, the performance monitor 42 will send an update signal to the buffer 44.

In response to the received update signal, the buffer 44 reads information about the executed instruction group from the completion unit of the processor 40. In particular, the buffer 44 can obtain from the processor 40 addresses of respective instructions in the instruction group that has just been executed.

It is appreciated that the buffer 44 may also be triggered in another manner so as to read address information of the instruction group. In one embodiment, the performance monitor 42 generates the above update signal in another manner, for example, by directly forwarding the captured instruction group complete signal to the buffer 44 as update signal without counting the signals. Alternatively, in another embodiment, the buffer 44 may directly capture the above instruction group complete signal from the completion unit, and read address information of the executed instruction group from the processor 40 upon triggered by the signal.

It is to be noted that, in this stage, the instructions executed by the processor 40 are machine instructions, that is, assembly instructions. The processor often uses logical addresses to identify these instructions, and thus, addresses acquired by the buffer 44 via the above manner are logical addresses of machine instructions.

To record the acquired instruction addresses, in one embodiment, the buffer 44 records logical addresses of the read instructions one by one and marks the instructions of a same group. In another embodiment, the buffer 44 comprises an address register 441 for recording the address of the first instruction in an instruction group and an offset register 442 for recording offsets of addresses of other instructions in the instruction group relative to the address of the first instruction. Since logical addresses assigned to instructions in the queue by the processor 40 are generally continuous, based on the address of the first instruction in an instruction group and offsets of other instructions relative to the first instruction, it is very easy to obtain addresses of all instructions in the instruction group. Therefore, by using the address register 441 and the offset register 442, the buffer 44 can use relatively small buffer space to record address information of the grouped instructions.

Based on the above-described processing system, addresses of the grouped machine instructions can be read from the buffer 44, as indicated by step 31 in FIG. 3. In particular, the read addresses may include address of the first instruction in an instruction group and offsets of other instructions relative to the first instruction.

In one embodiment, the buffer 44 records therein address information of a plurality of instruction groups, and in response to the update signal, continuously updates and adds address information. Accordingly, in step 31, address information of the above plurality of instruction groups may be read periodically from the buffer 44. In another embodiment, the buffer 44 updates the stored information with the address information of the latest instruction group in response to the update signal, that is, only the address information of the newly executed instruction group is stored each time. In this case, at step 31, in response to the update signal, the address information of the latest instruction group is read from buffer 44 each time, and in conjunction with previously read instruction addresses, the address information of a plurality of instruction groups are obtained.

According to one embodiment, at step 31, the obtained address information of a plurality of instruction groups is organized into an address file. The format of the address file should be supported by subsequent tool and application for analyzing and processing instruction addresses.

Figures 5, 6A, 6B:
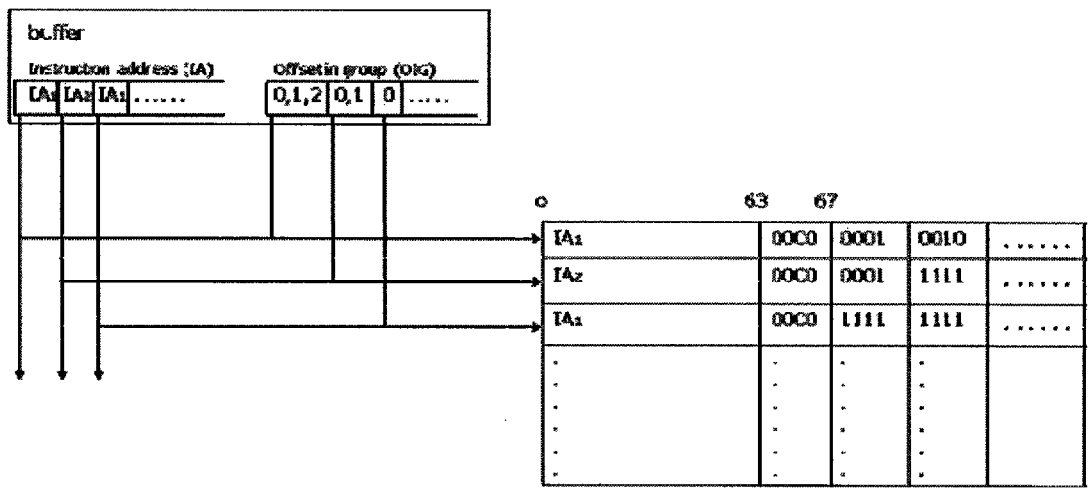
FIG. 5 shows an example of an address table according to an embodiment of the invention.
FIG. 6A shows an example of grouping information of machine instructions according to an embodiment of the invention.
FIG. 6B shows an example of instruction conversion table according to an embodiment of the invention.

In one specific example, the address information of a plurality of instruction groups is organized into an address table so as to form the address file. FIG. 5 shows an example of an address table according to an embodiment of the invention. In the example of FIG. 5, address information of three instruction groups stored in the buffer is illustrative shown. In the first instruction group, address of the first instruction is IA1, offsets of instructions relative to the first instruction are 0, 1, 2 respectively, wherein 0 represents the first instruction itself; in the second instruction group, address of the first instruction is IA2, offsets of instructions are 0,1; in the third instruction group, address of the first instruction is IA1, offsets of instructions are 0, that is, the third instruction group only includes one instruction with address IA1. For these instruction information obtained from the buffer, the address table in the right graph may be utilized to record instruction addresses of each group. As shown in the right graph, each item or entry (for example, each row) of the address table represents one instruction group, including the address of the first instruction in that instruction group and address offsets of other instructions relative to the first instruction represented in binary form. In particular, in each row, bits 0-63 are reserved for recording full address of the first instruction in an instruction group, and the following bits are used for recording offsets of other instructions in that instruction group relative to the first instruction. In case that the offset values are not larger than 15, 4 bits may be used to represent one offset value. For example, the first row in the table records address information of the first instruction group, in which the first 64 bits records address IA1 of the first instruction in that first instruction group, the next 12 bits record respectively three offsets 0, 1, 2 in binary representation: 0000, 0001, 0010. Accordingly, the second and third row of the table record instruction address of the above second and third instruction group respectively. Thus, through such a table, grouping status of instructions may be simply recorded with numbers.

It is appreciated that an address file with other format may also be used to record instruction address information, for example, a file recording full address of each instruction, and marking start and end of an instruction group with a particular sign, etc. It is appreciated that those skilled in the art may employ an address file with more forms, as long as such form is in accordance with subsequent relevant application and can be supported by subsequent application.

On the basis that the above address file is formed, at step 33 of FIG. 3, the method of an embodiment analyzes the address file so as to obtain grouping information of machine instructions.

Specifically, in one embodiment, through analyzing the above address file, it can be learned the number of instruction groups contained in that address file, the number of instructions contained in each instruction group and the address for each instruction. Further, instruction groups occurred in the address file may also be counted and statistics may be collected, thereby acquiring occurrence times or occurrence frequency of each instruction group.

FIG. 6A shows an example of grouping information of machine instructions according to an embodiment of the invention. In this example, by analyzing the address file, occurrence times of each instruction group is obtained through statistics collection, in which each instruction group is marked through address of the first instruction and offsets of other instructions in the group. In particular, the first instruction group only contains one instruction and occurrence times is 2; the second instruction group contains totally two instructions, that is, an instruction whose end of address is 164 and an instruction whose relative offset is 1, the two instructions occur 10 times as one instruction group. Based on the grouping information of FIG. 6A, more specific information may further be derived, such as number of times each instruction occurs. Furthermore, it is appreciated that the grouping information obtained at step 33 is not limited to the information and format shown in FIG. 6A.

However, it will be understood that instructions at this point are still machine instructions and are identified with logical addresses, as illustratively shown in FIG. 6A. Generally, a user (such as an analyzer or an engineer) cannot directly interpret such machine instructions identified with logical addresses, so it is far from adequate for learning and utilizing instruction grouping by merely obtaining such information.

Therefore, at step 35 of FIG. 3, the method of an embodiment converts machine instructions in the above address file into readable instructions. Here, the readable instructions refer to instructions that can be directly interpreted by those skilled in the art such as a programmer, an engineer etc. In one embodiment, conversion of instructions may be performed by utilizing an a2n tool and a disassembler.

The a2n (address to name) tool is a tool provided in existing operating systems for finding, based on address of an instruction, an executable code symbol (generally, name of the called function) corresponding to that instruction. After such function is determined through the a2n tool, the instruction stream implementing the function may be retrieved. Generally, the instruction stream at this point is in form of binary codes. Next, the above instruction stream is disassembled with a disassembler into readable instructions that can be understood by a user. Thus, machine instructions obtained from the processor may be converted into readable instructions by comprehensively using an a2n tool and a disassembler.

FIG. 6B shows an example of an instruction conversion table according to an embodiment of the invention. In the example of FIG. 6B, instruction conversion is performed on instructions involved in the grouping information of FIG. 6A, and a conversion table is thus formed by giving the correspondence between the instruction identifiers before and after the conversion. In particular, each instruction is converted into a readable instruction according to its address. For clarity and simplicity, here, a, b, c and d are used to schematically show the converted readable instructions.

It is appreciated that, although in the illustration of FIG. 3, the step 35 of converting instructions is performed after the step 33 of obtaining grouping information of machine instructions, such execution manner is merely illustrative. In fact, execution order of step 33 and step 35 is not limited by this illustration. In one embodiment, step 35 may be executed first to perform instruction conversion, then step 33 is executed to obtain grouping information of machine instructions; alternatively, in another embodiment, step 33 and 35 may be executed simultaneously. Therefore, step 33 and 35 may be executed in any order, so as to perform analysis and conversion on machine instructions respectively.

Based on grouping information of machine instructions obtained at step 33 and conversion information obtained at step 35, at step 37 of FIG. 3, grouping information of readable instructions are obtained by synthesizing the above two types of information. Specifically, in grouping information of machine instructions, each machine instruction is still identified with an instruction address. While in other hand, instruction conversion performed in step 35 has given correspondence relationship between instruction address and readable instruction. Based on such correspondence relationship, grouping information of readable instructions can be obtained by substituting machine instructions in grouping information of machine instructions with readable instructions. For example, in the grouping information of machine instructions illustratively shown in FIG. 6A, each row shows the grouping information of one instruction group, including the address of the first instruction and relative offsets of other instructions. Full addresses of respective instructions can be obtained by simply adding the above relative offsets to an address of the first instruction, respectively. The converted readable instructions can be obtained by comparing address of each instruction against the conversion table shown in FIG. 6B. Then, grouping information of readable instructions can be obtained by substituting machine instruction addresses with readable instructions, as shown in FIG. 7A, 7B.

Figures 7A, 7B, 8A:
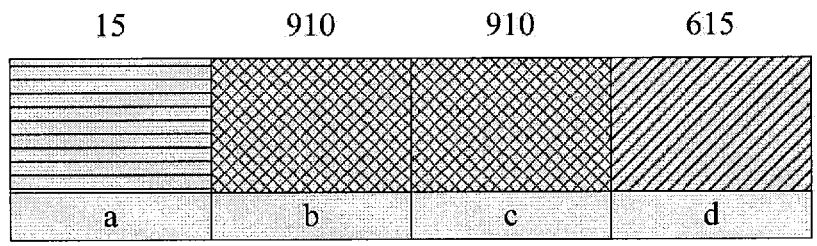
FIGS. 7A-7B show an example of grouping information of readable instructions according to an embodiment of the invention.
FIGS. 8A-8C show the graphical grouping of information according to embodiments of the invention.

It is appreciated that FIGS. 7A-7B show examples of grouping information of readable instructions according to an embodiment of the invention. Specifically, the example of FIG. 7A contains a variety of information relevant to instruction grouping, such as number of instruction groups, number of instructions contained in an instruction group, name of the instructions etc. Based on the above obtained grouping information, those skilled in art may also perform further analysis and statistic collection, so as to derive additional or more specific grouping information base on actual needs. For example, on basis of the grouping information of FIG. 7A, statistic collection may be performed on each individual instruction to obtain number of times the instruction occurs separately, number of times the instruction occurs in a group, number of times the instruction occurs as the first instruction in an instruction group etc, as shown in FIG. 7B. The process of obtaining such additional or more specific information is also within the scope of one or more aspects of the invention.

Since grouped instruction of a processor may be read from the buffer in real time at step 31, instruction grouping information thus obtained may be dynamic, so as to reflect status of grouping performed on instructions by the processor at runtime. Based on such instruction grouping information, a user (such as a programmer and an engineer) can clearly learn processing status of grouping performed on instructions by a processor, for example, how a processor performs grouping and processing on a given instruction stream; which instructions tend to form an instruction group, which instructions are more popular in instruction grouping, etc. Moreover, since instruction grouping information is shown in form of readable instruction, a user can more easily interpret such grouping information and perform code optimization with such information, so as to make the written or generated codes better take advantage of grouping rule of the processor.

To better illustrate the above instruction grouping information, in one embodiment, the method of FIG. 3 also includes a displaying step (not shown), in which the obtained grouping information of readable instructions is shown visually and graphically.

Figure 8B:
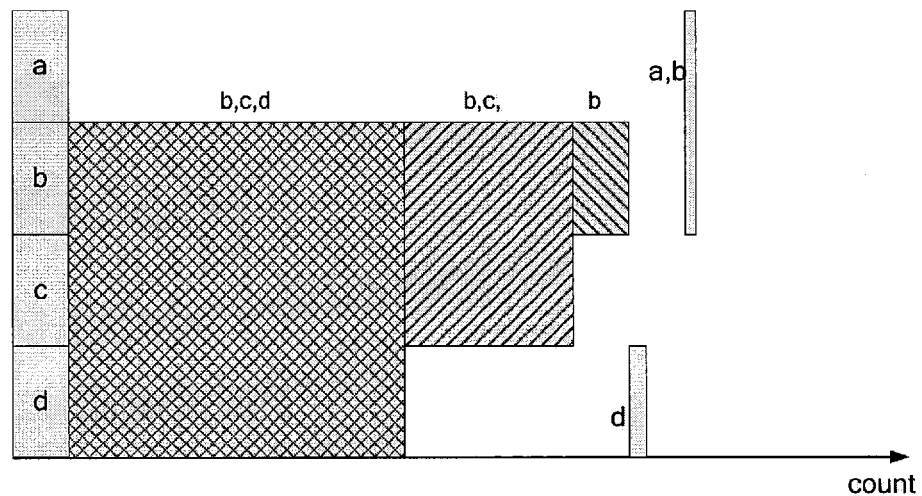
Figure 8C:
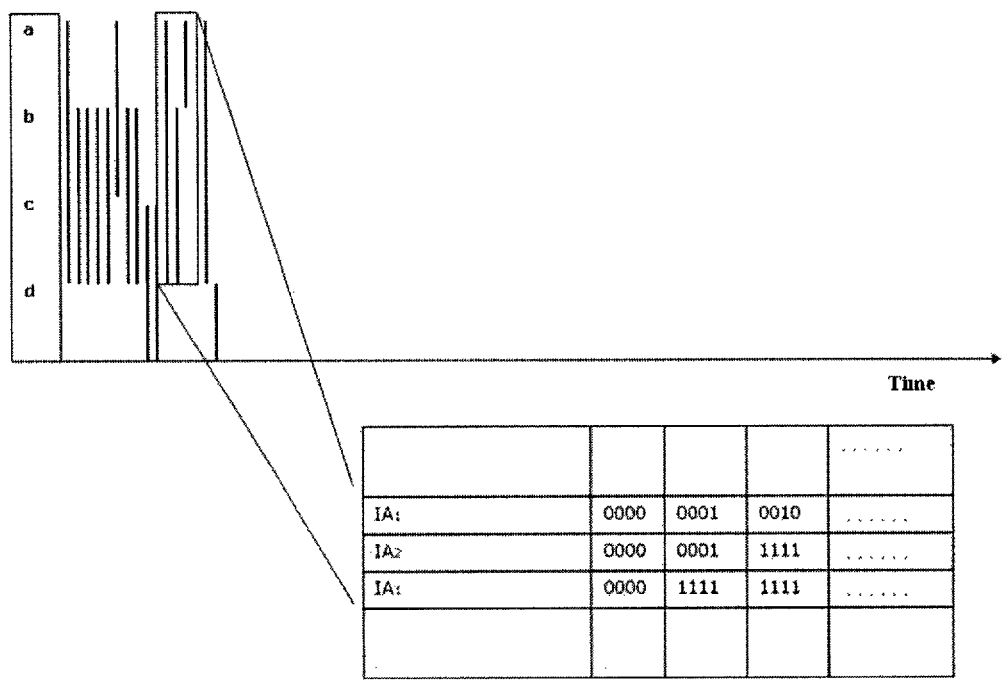

FIGS. 8A-8C show the graphical grouping information according to embodiments of the invention. In one embodiment, a hotness bar is used to represent hotness value of each instruction, wherein the hotness value is in proportion to number of times the instruction occurs in an instruction group. That is, the larger the number of times an instruction is a member of an instruction group, the "hotter" that instruction is for instruction grouping, and thus the higher the hotness value is. Moreover, different colors or patterns may be used on the hotness bar to represent different ranges of hotness value, so as to make representation of instruction hotness more intuitive. FIG. 8A shows hotness bars represented according to instruction grouping information of FIG. 7B, in which hotness of instructions a, b, c, d are shown.

In one embodiment, occurrence status of respective instruction groups is represented with statistic blocks. FIG. 8B shows a statistic block view represented according to instruction grouping information of FIG. 7A. As shown, one statistic block is used to represent one instruction group, wherein height of the statistic block corresponds to number of instructions constituting that instruction group, and width of the statistic block equals to occurrence times of that instruction group. Based on thus defined height and width, area of each statistic block may be calculated and used as popular degree of that instruction group. Moreover, the statistic blocks may be arranged according to the calculated popular degree. In particular, statistic blocks may be arranged from left to right in the order of popular degree from large to small. In an example, different colors and/or patterns may also be used to fill these statistic blocks, thereby representing different ranges of popular degree.

In an example, the illustration of FIG. 8A and FIG. 8B may be combined together to show both hotness of a single instruction and popular degree of an instruction group.

In one embodiment, variation of instruction grouping information over time may also be depicted, as shown in FIG. 8C. In the view of FIG. 8C, the horizontal axis represents time, the vertical axis represents instructions being executed, and the vertical line segment covering several instructions represents constitution of an instruction group executed by a processor at certain point of time. With updating of instruction grouping information, the vertical line segment representing the instruction group being executed varies with time axis, so as to dynamically show status of grouping performed on instructions by the processor. In an example, by selecting vertical line segment in a certain region, details of the instruction group corresponding to that line segment may be shown, including address of the first instruction, offsets of other instructions, etc.

It is appreciated that by visually and graphically illustrating instruction grouping information, it is possible to make the representation of grouping information more intuitive, so as to facilitate user's understanding and analysis. In other embodiments, it will occur to those skilled in the art to employ other display manners under teaching of the disclosure of the embodiments of the invention; these display manners are also within inventive conception scope of the invention.

Therefore, the method of one aspect of the invention, by reading addresses of machine instructions grouped by a processor at runtime, and analyzing and converting the read machine instructions, obtains grouping information of readable instructions and optionally presents such grouping information visually. With such a method, a user can learn status of grouping performed on instructions by a processor, so as to better take advantage of processing performance of the processor.

Figure 9:
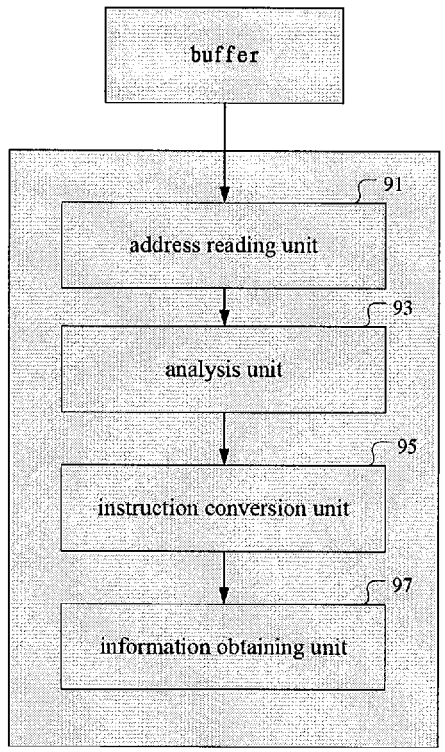
FIG. 9 shows a schematic block diagram of an apparatus according to an embodiment of the invention.

Under the same inventive conception, an embodiment of the invention also provides an apparatus for processing instruction grouping information. FIG. 9 shows a schematic block diagram of an apparatus according to an embodiment of the invention. As shown in FIG. 9, the apparatus of one embodiment comprises: an address reading unit 91 configured to read addresses of machine instructions grouped by a processor at runtime from a buffer to form an address file; an analysis unit 93 configured to analyze the address file to obtain grouping information of the machine instructions; an instruction conversion unit 95 configured to convert the machine instructions in the address file into readable instructions; and an information obtaining unit 97 configured to obtain grouping information of the readable instructions based on the grouping information of the machine instructions and the readable instructions resulted from conversion.

In particular, the address reading unit 91 reads addresses of the grouped instructions from a buffer of a processing system. The buffer may be as shown in FIG. 4. Based on such buffer, the address reading unit 91 can read addresses of machine instructions in each instruction group, including full address of the first instruction in an instruction group and offsets of other instructions relative to the first instruction. On basis that address information of multiple instruction groups is obtained, the address reading unit 91 can organize these address information into an address file, such as an address table. Format of the address file should be supported by subsequent tool and application for analyzing and processing instruction addresses. An example of an address table is shown in FIG. 5.

On the basis that the address file is formed, the analysis unit 93 analyzes the address file to obtain grouping information of machine instructions, including number of instruction groups, number of instructions in each instruction group, addresses of the instructions, etc. Further, the analysis unit 93 may also collect statistics about instruction groups occurred in the address file, thereby acquiring occurrence times or occurrence frequency of each instruction group. FIG. 6A shows an example of grouping information of machine instructions according to an embodiment of the invention.

On the other hand, the instruction conversion unit 95 converts machine instructions in the above address file into readable instructions. In particular, the instruction conversion unit 95 can utilize an a2n tool to find the name of an executable function corresponding to an instruction based on address of the instruction, and retrieve the instruction stream corresponding to that function, and then use a disassembler to disassemble such instruction stream into readable instructions that can be understood by users. An example of instruction conversion is shown in FIG. 6B.

It is appreciated that the above analysis unit 93 and instruction conversion unit 95 can operate independently to each other without being limited by execution order.

Based on grouping information of machine instructions obtained by analysis unit 93 and conversion information obtained by instruction conversion unit 95, the information obtaining unit 97 obtains grouping information of readable instructions by synthesizing the above two types of information. FIGS. 7A-7B show examples of grouping information of readable instructions according to an embodiment of the invention.

To better illustrate the obtained instruction grouping information, in one embodiment, the apparatus of FIG. 9 also includes a displaying unit (not shown) configured to show the obtained grouping information of readable instructions visually and graphically. In particular, the displaying unit may show hotness value of a single instruction in form of a hotness bar, as shown in FIG. 8A; in one embodiment, the displaying unit may utilize statistic blocks to represent occurrence status of respective instruction groups, as shown in FIG. 8B; in an example, the displaying unit may also combine the illustration of FIG. 8A and FIG. 8B together for displaying the grouping information; in another embodiment, the displaying unit may also show variation of instruction grouping information over time, as shown in FIG. 8C.

Since operation principle of the apparatus shown in FIG. 9 is in accordance with the foregoing method described with reference to FIG. 3, description thereof will be omitted for brevity. With the above method and apparatus, status of grouping performed on instructions by a processor may be obtained dynamically and represented in user readable form, such that a user can learn grouping information of instructions so as to better take advantage of processing performance of the processor.

Figure 10:
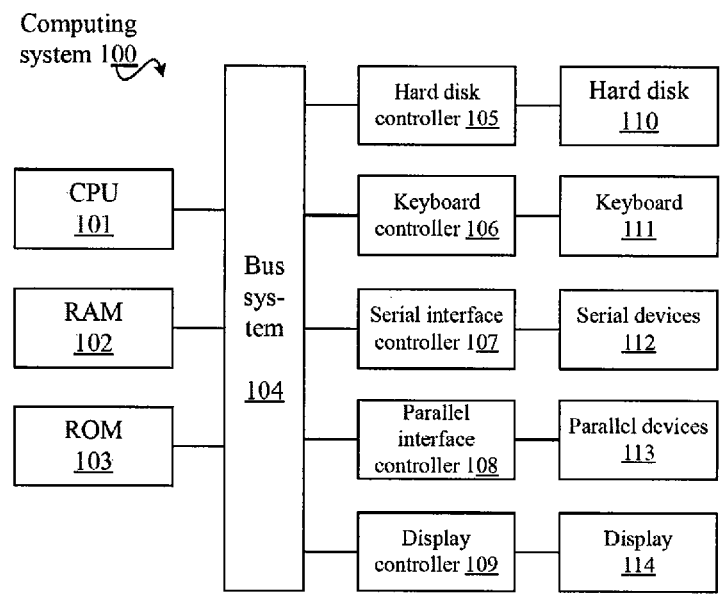
FIG. 10 shows a block diagram of an illustrative computing system adapted to implement embodiments of the invention.

FIG. 10 shows a block diagram of an illustrative computing system 100 adapted to implement embodiments of the invention. As shown, the computer system 100 may comprise: a CPU (Central Processing Unit) 101, a RAM (Random Access Memory) 102, a ROM (Read-Only Memory) 103, a system bus 104, a hard disk controller 105, a keyboard controller 106, a serial interface controller 107, a parallel interface controller 108, a display controller 109, a hard disk 110, a keyboard 111, a serial external device 112, a parallel external device 113 and a display 114. Among these devices, the system bus 104 couples to the CPU 101, the RAM 102, the ROM 103, the hard disk controller 105, the keyboard controller 106, the serial interface controller 107, the parallel controller 108 and the display controller 109. The hard disk is coupled to the hard disk controller 105, the keyboard 111 is coupled to the keyboard controller 106, the serial external device 112 is coupled to the serial interface controller 107, the parallel external device 113 is coupled to the parallel interface controller 108, and the display 114 is coupled to the display controller 109. It is appreciated that the structural block diagram shown in FIG. 10 is merely for purpose of illustration, rather than being a limitation to the scope of aspects of the invention. In some circumstances, certain devices may be added or removed based on actual condition.

The flowcharts and block diagrams in the accompanying drawings illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although respective apparatus and method of the present invention have been described in detail in conjunction with specific embodiments, the present invention is not limited thereto. Under teaching of the specification, various changes, replacements and modifications may be made to the invention by those skilled in the art without departing from the spirit and scope of the invention. It is appreciated that all such changes, replacements and modifications still fall within the protection scope of aspects of the invention. The scope of aspects of the invention is defined by the appended claims.

What is claimed is:

1. A method of processing instruction grouping information, comprising:
   grouping, by a processor at runtime, machine instructions into one or more instruction groups, wherein the processor includes out-of-order execution;
   obtaining, by the processor from a buffer, addresses of machine instructions grouped into the one or more instruction groups;
   forming an address file from the obtained addresses;
   determining, by the processor, from the address file, grouping information of the machine instructions, wherein the grouping information comprises at least one of a number of instruction groups or a number of instructions in each instruction group;
   converting the machine instructions which are not directly interpretable by a user into readable instructions which are directly interpretable by the user;
   based on information obtained from the converting and from the grouping information of the machine instructions, obtaining grouping information of the readable instructions; and
   using the grouping information of the readable instructions to perform code optimization.

2. The method of claim 1, wherein the addresses of the machine instructions comprise an address of a first instruction in a first instruction group and address offsets of other instructions in the first instruction group relative to the first instruction.

3. The method of claim 1, wherein the address file comprises an address table, each entry in the address table corresponding to one instruction group.

4. The method of claim 1, wherein the determining comprises collecting statistics about instruction groups in the address file.

5. The method of claim 1, wherein the converting the machine instructions into readable instructions comprises:
   determining an executable function corresponding to a machine instruction based on an address of the machine instruction;
   retrieving an instruction stream corresponding to the executable function; and
   disassembling the instruction stream to obtain one or more readable instructions.

6. The method of claim 1, wherein the obtaining grouping information of the readable instructions comprises substituting machine instructions in the grouping information of the machine instructions with the readable instructions.

7. The method of claim 1, wherein the grouping information of the readable instructions comprises at least one of: a number of instruction groups, a number of instructions contained in an instruction group, readable instructions in the instruction group, a number of times an instruction occurs, a number of times the instruction occurs in the instruction group, or a number of times the instruction occurs as a first instruction in the instruction group.

8. The method of claim 1, further comprising presenting the grouping information of the readable instructions in graphic form.

9. The method of claim 8, wherein said presenting the grouping information of the readable instructions in graphic form comprises at least one of the following:
   displaying a hotness value of an individual instruction as a hotness bar;
   indicating occurrence status of respective instruction groups with statistical blocks; or
   depicting variation of instruction grouping information over time.

10. A system for processing instruction grouping information, comprising:
    a memory;
    a processor in communication with the memory; and
    program instructions executable by the processor via the memory to perform a method, the method comprising:
      grouping, by the processor at runtime, machine instructions into one or more instruction groups, wherein the processor includes out-of-order execution;
      obtaining, by the processor from a buffer, addresses of machine instructions grouped into the one or more instruction groups;
      forming an address file from the obtained addresses;
      determining, by the processor, from the address file, grouping information of the machine instructions, wherein the grouping information comprises at least one of a number of instruction groups or a number of instructions in each instruction group;
      converting the machine instructions which are not directly interpretable by a user into readable instructions which are directly interpretable by the user;
      based on information obtained from the converting and from the grouping information of the machine instructions, obtaining grouping information of the readable instructions; and
      using the grouping information of the readable instructions to perform code optimization.

11. The system of claim 10, wherein the addresses of the machine instructions comprise an address of a first instruction in a first instruction group and address offsets of other instructions in the first instruction group relative to the first instruction.

12. The system of claim 10, wherein the address file comprises an address table, wherein each entry in the address table corresponding to one instruction group.

13. The system of claim 10, wherein the determining addresses comprises collecting statistics about instruction groups in the address file.

14. The system of claim 10, wherein the converting the machine instructions into readable instructions comprises:
    determining an executable function corresponding to a machine instruction based on an address of the machine instruction;
    retrieving an instruction stream corresponding to the function; and
    disassembling the instruction stream to obtain one or more readable instructions.

15. The system of claim 10, wherein the obtaining grouping information of the readable instructions comprises substituting machine instructions in the grouping information of the machine instructions with the readable instructions.

16. The system of claim 10, wherein the grouping information of the readable instructions comprises at least one of: a number of instruction groups, a number of instructions contained in an instruction group, readable instructions in the instruction group, a number of times an instruction occurs, a number of times the instruction occurs in the instruction group, or a number of times the instruction occurs as a first instruction in the instruction group.

17. The system of claim 10, wherein the method further comprises presenting the grouping information of the readable instructions in graphic form.

18. The system of claim 17, wherein the presenting comprises:
    displaying a hotness value of an individual instruction as a hotness bar;
    indicating occurrence status of respective instruction groups with statistical blocks; or
    depicting variation of instruction grouping information over time.

19. A computer program product for processing instruction grouping information, the computer program product comprising:
    a computer readable storage medium readable by a processing circuit and storing instructions for execution by the processing circuit for performing a method comprising:
        grouping, by a processor at runtime, machine instructions into one or more instruction groups, wherein the processor includes out-of-order execution;
        obtaining, by the processor from a buffer, addresses of machine instructions grouped into the one or more instruction groups;
        forming an address file from the obtained addresses;
        determining, by the processor, from the address file, grouping information of the machine instructions, wherein the grouping information comprises at least one of a number of instruction groups or a number of instructions in each instruction group;
        converting the machine instructions which are not directly interpretable by a user into readable instructions which are directly interpretable by the user;
        based on information obtained from the converting and from the grouping information of the machine instructions, obtaining grouping information of the readable instructions: and
        using the grouping information of the readable instruction to perform code optimization.

20. The computer program product of claim 19, wherein the addresses of the machine instructions comprise an address of a first instruction in a first instruction group and address offsets of other instructions in the first instruction group relative to the first instruction.

\* \* \* \* \*